United States Patent
Kim et al.

(10) Patent No.: US 10,637,114 B2
(45) Date of Patent: Apr. 28, 2020

(54) LITHIUM AIR BATTERY AND METHOD OF PREPARING THE SAME

(71) Applicant: Samsung Electronics Co., Ltd., Suwon-si, Gyeonggi-do (KR)

(72) Inventors: Taeyoung Kim, Seoul (KR); Dongjoon Lee, Suwon-si (KR); Heungchan Lee, Seongnam-si (KR); Dongmin Im, Seoul (KR); Wonsung Choi, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 117 days.

(21) Appl. No.: 14/719,492

(22) Filed: May 22, 2015

(65) Prior Publication Data

US 2016/0064785 A1    Mar. 3, 2016

(30) Foreign Application Priority Data

Aug. 27, 2014 (KR) .................. 10-2014-0112334

(51) Int. Cl.
| | | |
|---|---|---|
| *H01M 12/08* | (2006.01) | |
| *H01M 2/16* | (2006.01) | |
| *H01M 4/86* | (2006.01) | |
| *H01M 10/056* | (2010.01) | |
| *H01M 4/38* | (2006.01) | |

(52) U.S. Cl.
CPC ......... *H01M 12/08* (2013.01); *H01M 2/1673* (2013.01); *H01M 2/1686* (2013.01); *H01M 4/8647* (2013.01); *H01M 4/382* (2013.01); *H01M 10/056* (2013.01); *H01M 2300/0065* (2013.01); *H01M 2300/0094* (2013.01); *Y02E 60/128* (2013.01)

(58) Field of Classification Search
CPC .. H01M 12/08; H01M 2/1686; H01M 2/1673; H01M 4/8647; H01M 4/382; H01M 2300/0065; H01M 2300/0094; H01M 10/056; Y02E 60/128
See application file for complete search history.

(56) References Cited

U.S. PATENT DOCUMENTS

| | | | |
|---|---|---|---|
| 7,282,295 B2 | 10/2007 | Visco et al. | |
| 7,691,536 B2 | 4/2010 | Johnson | |
| 7,767,345 B2 | 8/2010 | Imagawa et al. | |
| 8,389,147 B2 | 3/2013 | Visco et al. | |
| 2007/0231704 A1 | 10/2007 | Inda | |
| 2008/0070087 A1 | 3/2008 | Johnson | |
| 2011/0059355 A1 | 3/2011 | Zhang et al. | |
| 2011/0129739 A1 | 6/2011 | Nakanishi | |
| 2011/0223494 A1 | 9/2011 | Feaver et al. | |

(Continued)

FOREIGN PATENT DOCUMENTS

| | | |
|---|---|---|
| JP | 2013-012385 A | 1/2013 |
| JP | 5453055 B2 | 1/2014 |

(Continued)

*Primary Examiner* — Eugenia Wang
(74) *Attorney, Agent, or Firm* — Cantor Colburn LLP (57) ABSTRACT

A lithium air battery including: a composite cathode including a porous material and a first solid electrolyte; a lithium metal anode; an oxygen blocking layer adjacent to the anode; and a cathode interlayer disposed between the composite cathode and the oxygen blocking layer, wherein the cathode interlayer includes a lithium ion conducting second solid electrolyte.

18 Claims, 3 Drawing Sheets

(56) References Cited

U.S. PATENT DOCUMENTS

| | | |
|---|---|---|
| 2012/0077084 A1 | 3/2012 | Christensen et al. |
| 2012/0077095 A1 | 3/2012 | Roumi et al. |
| 2012/0115048 A1 | 5/2012 | Roev et al. |
| 2012/0141889 A1 | 6/2012 | Lee et al. |
| 2012/0208096 A1* | 8/2012 | Kuboki ................ H01M 4/382 429/405 |
| 2012/0276459 A1 | 11/2012 | Im et al. |
| 2013/0108934 A1 | 5/2013 | Lee et al. |
| 2013/0115527 A1 | 5/2013 | Au |
| 2013/0143133 A1* | 6/2013 | Barde ................... H01M 4/381 429/405 |
| 2013/0224609 A1 | 8/2013 | Lee et al. |
| 2013/0330639 A1 | 12/2013 | Lee et al. |
| 2014/0011101 A1 | 1/2014 | Ma et al. |
| 2014/0234733 A1 | 8/2014 | Roev et al. |
| 2014/0349197 A1* | 11/2014 | Schilm ................... H01M 6/18 429/320 |
| 2015/0079485 A1 | 3/2015 | Choi et al. |
| 2016/0043408 A1 | 2/2016 | Kwon et al. |

FOREIGN PATENT DOCUMENTS

| | | | | |
|---|---|---|---|---|
| WO | WO-2011011082 A1 * | 1/2011 | .......... | H01M 4/8605 |
| WO | WO 2013087355 A1 * | 6/2013 | .............. | H01M 6/18 |

* cited by examiner

LITHIUM AIR BATTERY AND METHOD OF PREPARING THE SAME

RELATED APPLICATION

This application claims priority to and the benefit of Korean Patent Application No. 10-2014-0112334, filed on Aug. 27, 2014, in the Korean Intellectual Property Office, and all the benefits accruing therefrom under 35 U.S.C. § 119, the content of which is incorporated herein in its entirety by reference.

BACKGROUND

1. Field

The present disclosure relates to a lithium air battery and a method of preparing the same.

2. Description of the Related Art

A lithium air battery generally includes an anode capable of incorporating and deincorporating, e.g., intercalating and deintercalating, lithium ions, a cathode that oxidizes and reduces oxygen present in the air, and a lithium ion conducting medium disposed between the cathode and the anode.

Since the lithium air battery uses lithium metal as the anode and oxygen from ambient air as a cathode active material, the lithium air battery may have a high capacity. Lithium air batteries have a high theoretical specific energy of 3500 Wh/kg or greater, which is about ten times higher than that of lithium ion batteries.

In a lithium air battery including a liquid electrolyte, a large amount of the liquid electrolyte is used to fill pores of a cathode, and the liquid electrolyte contributes to the total weight of the cell. To reduce the weight of the cell, application of a solid electrolyte as an electrolyte in a cathode has been tried.

A cathode for a lithium air battery including a solid electrolyte further includes a conducting material in addition to the solid electrolyte. The presence of the conducting material decreases a surface area of the solid electrolyte of the cathode which contacts a lithium ion conducting medium. Further, surface irregularity of the cathode increases an interfacial resistance between the cathode and the lithium ion conducting medium.

Therefore, there remains a need for an improved battery and a method for reducing an interfacial resistance between the cathode and the lithium ion conducting medium.

SUMMARY

Provided is a lithium air battery in which an ionically conductive interlayer is disposed between a positive electrode and a lithium ion conducting medium.

Provided is a method of preparing the lithium air battery.

Additional aspects will be set forth in part in the description which follows and, in part, will be apparent from the description.

According to an aspect, a lithium air battery includes: a composite cathode including a porous material and a first solid electrolyte; a lithium metal anode; an oxygen blocking layer adjacent to the anode; and a cathode interlayer disposed between the cathode and the oxygen blocking layer, wherein the cathode interlayer includes a lithium ion conductive second solid electrolyte.

According to an aspect, a method of preparing a lithium air battery includes: disposing a cathode interlayer including a second solid electrolyte on an oxygen blocking layer; disposing a lithium metal anode on the oxygen blocking layer; and disposing a composite cathode on the cathode interlayer to prepare the lithium battery.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Rare earth" means the fifteen lanthanide elements, i.e., atomic numbers 57 to 71, plus scandium and yttrium.

The "lanthanide elements" means the chemical elements with atomic numbers 57 to 71.

Hereinafter, according to one or more exemplary embodiments, a lithium air battery and a method of preparing the same will be disclosed in further detail.

According to an embodiment, a lithium air battery includes a composite cathode including a porous material and a first solid electrolyte; a lithium metal anode; an oxygen blocking layer disposed adjacent to the anode; and a cathode interlayer disposed between the cathode and the oxygen blocking layer, wherein the cathode interlayer includes a lithium ion conductive second solid electrolyte.

The lithium air battery may use a liquid electrolyte or a solid electrolyte. When the lithium air battery uses a solid electrolyte, a reaction mechanism may be represented by Reaction Scheme 1 below.

Reaction Scheme 1

During discharge, lithium derived from an anode reacts with oxygen introduced from a cathode to generate a lithium oxide, and oxygen is reduced in an oxygen reduction reaction (ORR). During charge, the lithium oxide is reduced, and oxygen is generated by oxidation in an oxygen evolution reaction (OER). During discharge, $Li_2O_2$ is deposited in pores of the cathode, and a capacity of the lithium air battery increases as an area of an electrolyte contacting oxygen in the cathode increases.

In the lithium air battery, while not wanting to be bound by theory, it is understood that since the cathode interlayer, which includes a solid electrolyte, is disposed between the cathode and the oxygen blocking layer, an interfacial resistance between the cathode and the oxygen blocking layer decreases, and thus charging/discharging characteristics of the lithium air battery may improve. Since the cathode interlayer has a low interfacial resistance with respect to both the cathode and the oxygen blocking layer, in spite of the fact that an additional layer is added, an interfacial resistance of the lithium air battery may be surprisingly less than an interfacial resistance of a battery not having the cathode interlayer wherein the cathode and the oxygen blocking layer directly contact each other.

As used herein, the term "solid electrolyte" denotes a lithium ion conductive electrolyte that retains a predetermined shape at room temperature, and does not intentionally include a low molecular-weight material, e.g., a compound having a molecular weight less than 200 Daltons, or less than 100 Daltons, such as water or an organic solvent. The solid electrolyte may be prepared using a solvent during a preparation process thereof wherein the solvent is substantially removed, e.g., by evacuation or drying. A trace amount of the solvent, which may remain in the solid electrolyte after the drying process, is considered as not included. For example, when the solid electrolyte is a polymer electrolyte, the solid electrolyte includes an ion conducting polymer and a lithium salt and does not intentionally include a low-molecular weight material such as water or an organic solvent, such as an organic solvent that is used for plasticizing a solid electrolyte. A content of a solvent, such as water, ethanol, hexane, or toluene, remaining in the solid electrolyte may be 0 to 1 weight percent (wt %), or 0 to 0.5 wt %, or 0.0001 to 0.1 wt %, or 0.001 to 0.01 wt %, based on a total weight of the solid electrolyte.

Further, the cathode interlayer may not comprise a gel. That is, the cathode interlayer may consist of a solid electrolyte, and thus may not include a gel electrolyte.

As used herein, the term "gel" denotes a material comprising a solid having a predetermined shape at room temperature and a low molecular weight material such as water or an organic solvent. The term "gel electrolyte" denotes an electrolyte having a lithium ion conductivity which comprises a solid and a low molecular weight material, e.g., a compound having a molecular weight less than 200 Daltons, or less than 100 Daltons, such as water or an organic solvent, to plasticize the solid. For example, the gel may be obtained by impregnating a polymer with a low molecular weight material, such as water or an organic solvent. For example, the gel electrolyte may be obtained by impregnating a porous solid, which does not have sufficient lithium ion conductivity, with a liquid electrolyte.

The cathode interlayer may be substantially non-porous. A porosity of the cathode interlayer may be about 0.00001 volume percent (vol %) to about 1 vol %, or about 0.001 vol % to about 0.1 vol %, based on a total volume of the cathode interlayer. The cathode interlayer may have a dense structure in which pores are not intentionally introduced. The cathode interlayer may be pervious to oxygen. For example, the cathode interlayer may be prepared by coating a substrate with polymeric solution and drying the solution. For example, the cathode interlayer may be prepared by melting and cooling an inorganic compound. For example, the non-porous cathode interlayer may be prepared by depositing an inorganic material.

In an embodiment, the cathode interlayer does not include a porous film or a membrane. The porous film may include, for example, a porous polymer, a porous metal oxide, or a porous carbonaceous material. Also, the porous film may include, for example, a porous polymer film that is used as a separator of a lithium ion battery and includes a plurality of pores that are either intentionally introduced or naturally formed therein, or a porous metal oxide film that is used as a separator of a lithium battery and includes a plurality of pores that are either intentionally introduced or naturally formed therein. The porous film includes a plurality of pores and thus may be easily impregnated with a liquid electrolyte or a solvent.

The cathode interlayer may have a thickness that is thinner than those of each of the cathode and the oxygen blocking layer. Since the cathode interlayer is a layer that is introduced to decrease an interfacial resistance between the cathode and the oxygen blocking layer, when a thickness of the cathode interlayer is greater than that of either of the cathode and the oxygen blocking layer, an ohmic resistance of the cathode interlayer may be significant, and thus a decrease of an interfacial resistance between the cathode and the oxygen blocking layer may be difficult.

For example, a thickness of the cathode interlayer may be about 50 micrometers (μm) or less. For example, a thickness of the cathode interlayer may be about 20 μm or less. For example, a thickness of the cathode interlayer may be about 10 μm or less. For example, a thickness of the cathode interlayer may be about 5 μm or less. For example, a thickness of the cathode interlayer may be about 3 μm or less. For example, a thickness of the cathode interlayer may be about 200 nanometers (nm) or greater. For example, a thickness of the cathode interlayer may be about 300 nm or greater. For example, a thickness of the cathode interlayer may be about 400 nm or greater. For example, a thickness of the cathode interlayer may be about 500 nm or greater. For example, a thickness of the cathode interlayer may be about 700 nm or greater. In an embodiment, thickness of the cathode interlayer may be about 200 nm to about 50 μm, or about 400 nm to about 20 μm, or about 700 nm to about 5 μm. When a thickness of the cathode interlayer is less than 200 nm, a defect may occur resulting in pin holes in the cathode interlayer, and thus an effect of decreasing an interfacial resistance may be insignificant. When a thickness of the cathode interlayer is greater than 50 μm, an effect of decreasing an interfacial resistance may be insignificant due to an ohmic resistance of the cathode interlayer itself.

The first solid electrolyte or the second solid electrolyte may include at least one of a polymer electrolyte, an inorganic electrolyte, and an organic-inorganic composite electrolyte. Further, the second solid electrolyte may be the same solid electrolyte as the first solid electrolyte.

For example, the cathode interlayer may include at least one of a polymer electrolyte, an inorganic electrolyte, and an organic-inorganic composite electrolyte as the second solid electrolyte.

The polymer electrolyte may include a polymer and a lithium salt. In the polymer electrolyte, a weight average molecular weight of the polymer may be in a range of about 1,000 to about 600,000 Daltons (Da), or about 10,000 to about 400,000 Da. When a weight average molecular weight of the polymer is less than 1,000 Da, a solid may not be obtained, and, when a weight average molecular weight of the polymer is greater than 600,000 Da, molding the polymer into various shapes may be difficult, and an ion conductivity of the polymer may decrease.

The polymer electrolyte may include at least one of an ion conducting polymer, a polymer ionic liquid, and a gelated organic electrolyte as a polymer.

Examples of the ion conducting polymer may include a blend of a salt, such as a lithium salt, such as $LiPF_6$ and at least one selected from polyethylene oxide (PEO), polyvinyl alcohol (PVA), polyvinylpyrrolidone (PVP), and Li-substituted tetrafluoroethylene-perfluoro-3,6-dioxa-4-methyl-7-octanesulfonic acid copolymer (e.g., Nafion®), but the ion conducting polymer is not limited thereto, and any suitable ion conducting polymer available in the art may be used.

Examples of the polymeric ionic liquid (PIL) may include at least one selected from poly(diallyldimethylammonium) bis(trifluoromethanesulfonyl)imide(poly(diallyldimethylammonium) TFSI), 1-allyl-3-methylimidazolium trifluoromethanesulfonylimide, and N-methyl-N-propylpiperidinium bis(trifluoromethanesulfonyl)imide, but the polymeric ionic liquid is not limited thereto, and any suitable polymeric ionic liquid available in the art may be used.

Examples of the solvent contained in the gelated organic electrolyte may include at least one selected from ethylmethylsulfone (EMS) and teteraethyleneglycoldimethylether (TEGDME), but they are not limited thereto, and any suitable solvent that may be used in a gelated organic electrolyte available in the art may be used.

Examples of the inorganic electrolyte may include at least one selected from a glassy electrolyte, an amorphous electrolyte, a ceramic electrolyte, and a glass-ceramic electrolyte.

Examples of the inorganic electrolyte may include at least one selected from $Cu_3N$, $Li_3N$, UPON, $Li_3PO_4.Li_2S.SiS_2$, $Li_2S.GeS_2.Ga_2S_3$, $Li_2O.11Al_2O_3$, $Na_2O.11Al_2O_3$, $(Na_zLi_{1-z})_{1+x}Ti_{2-x}Al_x(PO_4)_3$ (where, $0.1 \leq x \leq 0.9$ and $0 \leq z \leq 1$), $Li_{1+x}Hf_{2-x}Al_x(PO_4)_3$ (where, $0.1 \leq x' \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a sodium silicate, $Li_{0.3}La_{0.5}TiO_3$, $Na_5MSi_4O_{12}$ (where, M is a rare earth element such as Nd, Gd, or Dy), $Li_5ZrP_3O_{12}$, $Li_5TiP_3O_{12}$, $Li_3Fe_2P_3O_{12}$, $Li_4NbP_3O_{12}$, $Li_{1+x''}(M'Al_zGa_{1-z'})_{x''}(Ge_{1-y}Ti_y)_{2-x''}(PO_4)_3$ (where, $0 \leq x'' \leq 0.8$, $0 \leq y \leq 1.0$, $0 \leq z' \leq 1$, and M' is Nd, Sm, Eu, Gd, Tb, Dy, Ho, Er, Tm, or Yb), $Li_{1+q+y'}Q_qTi_{2-q}Si_yP_{3-y}O_{12}$ (where, $0 < q \leq 0.4$, $0 < y' \leq 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (where, M is Nb or Ta), and $Li_{7+r}A_rLa_{3-r}Zr_2O_{12}$ (where, $0 < r < 3$, and A is Zn), but the inorganic electrolyte is not limited thereto, and any suitable inorganic electrolyte available in the art may be used.

The organic-inorganic composite electrolyte may simultaneously include an organic electrolyte and an inorganic electrolyte, and may comprise a composite of the organic electrolyte and the inorganic electrolyte. The organic-inorganic composite electrolyte may include at least one selected from an ion conducting polymer, polymeric ionic liquid, and an inorganic electrolyte, but it is not limited thereto, and any suitable organic-inorganic composite electrolyte available in the art may be used.

The cathode interlayer may include an ion conducting polymer and a lithium salt. Since the cathode interlayer includes the ion conducting polymer and the lithium salt, an interfacial resistance between the cathode and the first solid anode electrolyte layer may be effectively decreased. The ion conducting polymer may be polyethylene oxide (PEO).

Examples of the lithium salt may include at least one selected from lithium bis(trifluoromethanesulfonyl)imide (LiTFSI), $LiPF_6$, $LiBF_4$, $LiAsF_6$, $LiClO_4$, $LiNO_3$, lithium bis(oxalato)borate (LiBOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and lithium trifluoromethanesulfonate (LiTFO), but the lithium salt is not limited thereto, and any suitable lithium salt available in the art may be used.

The cathode using oxygen as a cathode active material may include a conducting material as a porous material. The porous material may be any suitable material available in the art as long as the material has sufficient conductivity. For example, the porous material may be a carbonaceous material. Examples of the carbonaceous material may include a carbon black, graphite, graphene, active carbon, or a carbon fiber. In particular, examples of the carbonaceous material may include at least one selected from a carbon nanoparticle, carbon nanotube, carbon nanofiber, carbon nanosheet, carbon nanorod, and a carbon nanobelt, but they are not limited thereto, and any suitable carbonaceous material having a nanostructure may be used. The carbonaceous material may have a macroscopic structure in addition to the nanostructure. For example, the carbonaceous material may be in various forms such as particles, tubes, fibers, sheets, rods, or belts in having a dimension of about 1 µm to 100 µm, for example.

For example, the carbonaceous material may be mesoporous. For example, a part of or an entirety of the carbonaceous material in the various forms may be porous. Due to the inclusion of the porous carbonaceous material, pores may be introduced in the cathode, and thus a porous cathode may be formed. Since the carbonaceous material has the pores, a surface area of the cathode in contact with the electrolyte may increase. Further, supply and diffusion of oxygen within the cathode may be improved, and a space for deposition of products generated during the charge and discharge processes may be provided within the cathode.

Further, examples of the conducting material may include a metallic conducting material such as metal fibers or metal mesh. Moreover, examples of the conducting material may include a metallic powder comprising, for example, copper, silver, nickel, or aluminum. The conducting material may be an organic conducting material such as a polyphenylene derivative. The examples of the conducting material may be used alone or as a combination thereof.

The composite cathode includes the first solid electrolyte in addition to the porous material. The first solid electrolyte may be identical to or different from the second solid electrolyte that is used in the interlayer. The first solid electrolyte may include at least one selected from a polymer electrolyte, an inorganic electrolyte, and an organic-inorganic composite electrolyte. Since the composite cathode includes the first solid electrolyte, oxygen in the cathode is easily diffused, and a surface area of the electrolyte in contact with oxygen may increase.

A weight ratio of the porous material to the first solid electrolyte in the composite cathode may be in a range of about 1:2 to about 1:9, or about 1:3 to about 1:8, or about 1:4 to about 1:7, based on a total weight of the porous material and the first solid electrolyte. That is, a lithium air battery may have improved charge and discharge characteristics when an amount of the first solid electrolyte is contained in the composite cathode within a range of about 200 parts to about 900 parts by weight, or about 300 parts to about 800 parts by weight, or about 400 parts to about 700 parts by weight, based on 100 parts by weight of the porous material.

The composite cathode may further include a catalyst for oxidation/reduction of oxygen, and examples of the catalyst may include a noble metal-based catalyst, such as platinum, gold, silver, palladium, ruthenium, rhodium, or osmium; an oxide-based catalyst, such as a manganese oxide, an iron oxide, a cobalt oxide, or a nickel oxide; or an organic metal-based catalyst, such as cobalt phthalocyanine, but they are not limited thereto, and any suitable catalyst for oxidation and reduction of oxygen in the art may be used.

The catalyst may be supported on a carrier. Examples of the carrier may include an oxide, zeolite, clay minerals, or carbon. Examples of the oxide may include at least one oxide selected from alumina, silica, zirconium oxide, and titanium dioxide. Further, the oxide may be an oxide including at least one metal selected from Ce, Pr, Sm, Eu, Tb, Tm, Yb, Sb, Bi, V, Cr, Mn, Fe, Co, Ni, Cu, Nb, Mo, and W. Examples of the carbon may include a carbon black, such as ketjen black, acetylene black, channel black, or lamp black; a graphite, such as natural graphite, artificial graphite, or expanded graphite; an active carbon; and carbon fiber. However, the carrier is not limited thereto, and any suitable carrier available in the art may be used.

The composite cathode may further include a binder. The binder may include a thermoplastic resin or a thermosetting resin. Examples of the binder may include polyethylene, polypropylene, polytetrafluoroethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, and an ethylene-acrylic acid copolymer. The resin may be used alone or as a combination thereof, but the binder is not limited thereto, and any suitable binder available in the art may be used.

The composite cathode may be prepared by, for example, mixing the oxygen oxidation/reduction catalyst, the conducting material, the solid electrolyte, and the binder and adding an appropriate solvent thereto to prepare a cathode slurry, coating and drying a surface of a current collector with the cathode slurry, or, optionally, press-molding the cathode slurry to the current collector to improve an electrode density. The composite cathode may be prepared by further irradiating light thereon after the coating and drying process.

Further, the composite cathode may, optionally, include a lithium oxide. Optionally, the oxygen oxidation/reduction catalyst or the binder may be omitted.

The current collector may have a porous structure comprising a net shape or a mesh shape in order to increase a rate of oxygen diffusion. For example, the current collector may be a porous metal plate that comprises stainless steel, nickel, or aluminum, but it is not limited thereto, and any suitable current collector available in the art may be used. In order to prevent oxidation, the current collector may be coated with a metal or an alloy coating layer having an oxidation-resistant property.

The anode may be, for example, a lithium metal thin film. Examples of an alloy based on the lithium metal may include a lithium alloy with, for example, aluminum, tin, magnesium, indium, calcium, titanium, or vanadium.

Also, a separator may be disposed between the composite cathode and the anode. The separator may have any suitable composition that may tolerate the operating range of the lithium air battery, and examples of the separator may include a polymeric non-woven fabric such as a polypropylene based non-woven fabric or a polyphenylene sulfide based non-woven fabric, and a porous film of an olefin-based resin such as polyethylene or polypropylene. A combination thereof may be used, and in an embodiment the separator may include at least two thereof.

The oxygen blocking layer may be substantially or effectively impervious to oxygen. The oxygen blocking layer comprises a lithium ion conducting solid electrolyte layer that may serve as a protecting layer that protects the lithium metal anode from directly reacting with impurities, such as oxygen, included in the cathode electrolyte. In this regard, examples of the lithium ion conducting solid electrolyte film that is impervious to oxygen may include a lithium ion conducting glass, a crystalline lithium ion conducting compound (e.g., a ceramic or glass-ceramic), or an inorganic material comprising a combination thereof, but it is not limited thereto, and any suitable solid electrolyte film available in the art may be used as long as the solid electrolyte film has sufficient lithium ion conductivity, is impervious to oxygen, and may sufficiently protect an anode. In consideration of chemical stability, an example of the lithium ion conducting solid electrolyte film may be an oxide.

When the lithium ion conducting solid electrolyte film includes a large amount of a crystalline lithium ion conducting compound, the electrolyte layer may have a high ion conductivity. In this regard, an amount of the crystalline lithium ion conducting compound may be, for example, about 50 wt % or more, about 55 wt % or more, or about 60 wt % or more, or about 50 wt % to about 99 wt %, or about 55 wt % to about 95 wt %, based on the total weight of the solid electrolyte layer.

Examples of the crystalline lithium ion conducting compound may include at least one selected from a lithium ion conducting compound having a perovskite structure, such as $Li_3N$, $Li_{2+2n}Zn_{1-n}GeO_4$ wherein $0 \leq n \leq 1$ (LISICON), or $La_{0.55}Li_{0.35}TiO_3$; and $LiTi_2P_3O_{12}$ having a NASICON-type structure. A glass-ceramic comprising at least one of the forgoing may be used. The glass-ceramic may be a product of precipitating at least one of the forgoing.

The crystalline lithium ion conducting compound may comprise, for example, $Li_{1+x+y}(Al_zGa_{1-z})_x(Ti_y Ge_{1-y})_{2-x}Si_yP_{3-y}O_{12}$ (wherein $0 \leq z \leq 1$, $0 \leq y \leq 1$, $0 \leq x" \leq 1'$ and $0 \leq y' \leq 1$, for example wherein $0 \leq x \leq 0.4$ and $0 < y \leq 0.6$, or $0.1 \leq x \leq 0.3$ and $0.1 < y \leq 0.4$). To attain improved ion conductivity, the crystalline lithium ion conducting compound may not include a grain boundary that impedes ion conduction. For example, since the glass-ceramic may rarely include a pore or a grain boundary that interrupts ion conduction, improved ion conductivity and improved chemical stability may be attained.

Examples of the lithium ion conducting glass-ceramic may include a lithium-aluminum-germanium-phosphate (LAGP), a lithium-aluminum-titanium-phosphate (LATP), and a lithium-aluminum-titanium-silicon-phosphate (LATSP).

For example, when a glass has a composition of $Li_2O$—$Al_2O_3$—$TiO_2$—$SiO_2$—$P_2O_5$ and, when the glass is heat-treated to perform crystallization, the primary crystalline phase may comprise $Li_{1+x+y}Al_xTi_{2-x}Si_yP_{3-y}O_{12}$ (where, $0 \leq x \leq 1$ and $0 \leq y \leq 1$), where x and y satisfy, for example, $0 \leq x \leq 0.4$ and $0 < y \leq 0.6$, or $0.1 \leq x \leq 0.3$ and $0.1 < y \leq 0.4$.

As used herein, "a pore or a grain boundary that impedes ion conduction" refers to a structure that impedes ion conduction and reduces the total ion conductivity of an inorganic material to 1/10 or less, or 1/20 or less, of the intrinsic ion conductivity of the crystalline lithium ion conducting compound.

For example, the oxygen blocking layer may include $Li_{1+x+y}Al_xTi_{2-x}Si_yP_{3-y}O_{12}$ (where, $0 \leq x \leq 1$ and $0 \leq y \leq 1$). Here, x and y may satisfy, for example, $0 \leq x \leq 0.4$ and $0 < y \leq 0.6$, or $0.1 \leq x \leq 0.3$ and $0.1 < y \leq 0.4$.

For example, the oxygen blocking layer may include $Li_{1+x+y}Al_x(Ti_pGe_{1-p})_{2-x}Si_yP_{3-y}O_1$ (where, $0 \leq p \leq 1$, $0 \leq x \leq 2$ and $0 \leq y \leq 3$), and an example of the oxygen blocking layer may be a solid electrolyte layer including $Li_{1.4}Ti_{1.6}Al_{0.4}P_3O_{12}$ (LATP).

An anode interlayer may be further disposed between the anode and the oxygen blocking layer, and the anode interlayer may include a third solid anode electrolyte. The anode interlayer may prevent a side reaction that may occur between the anode and the oxygen blocking layer.

The anode interlayer may include a solid polymer electrolyte as the third solid electrolyte. For example, the solid polymer electrolyte may comprise polyethylene oxide (PEO) doped with a lithium salt, and examples of the lithium salt may include at least one selected from $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

The lithium air battery may be used as a lithium primary battery or a lithium secondary battery. Also, a shape of the lithium air battery is not particularly limited, and, for example, the lithium air battery may be of a coin-type, a button-type, a sheet-type, a laminated-type, a cylindrical-type, a flat-type, or a horn-type. In addition, the lithium air battery may be used in a large battery for electric vehicles.

Figure 1:
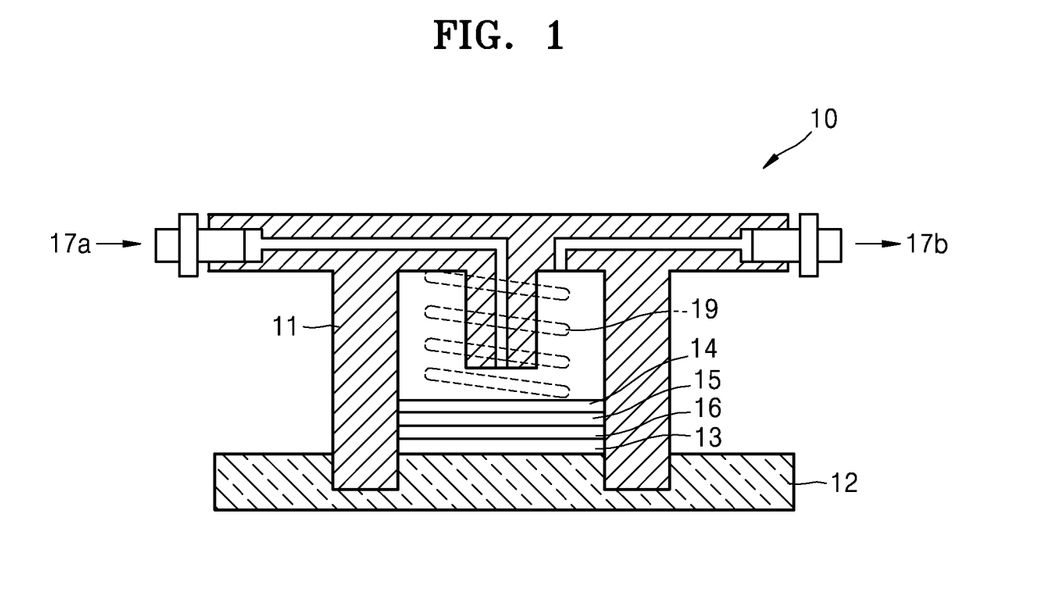
FIG. 1 is a schematic view of an embodiment of a structure of a lithium air battery.

An embodiment of the lithium air battery is schematically illustrated in FIG. 1. A lithium air battery 10 comprises a composite cathode 14, which uses oxygen as an active material, disposed adjacent to a first current collector (not shown), an anode 13 including lithium and adjacent to a second current collector 12, an oxygen blocking layer 16 adjacent to the anode 13, and a cathode interlayer 15 including a second solid electrolyte and disposed between the composite cathode 14 and the oxygen blocking layer 16. An anode interlayer (not shown) may be additionally disposed between the anode 13 and the oxygen blocking layer 16. The first current collector (not shown) is porous and may serve as a gas diffusion layer through which air may diffuse. A porous carbon paper (not shown) may be additionally disposed between the first current collector (not shown) and the composite cathode 14. A pressing member 19, through which air may be transferred to an air electrode, is disposed on the first current collector (not shown). A case 11 of an insulating resin material is disposed between the composite cathode 14 and the anode 13, and thus the cathode 14 and the anode 13 are electrically separated. Air is inserted though an air inlet port 17a and is discharged through an air outlet port 17b. The lithium air battery may be accommodated in a stainless steel reactor.

The term "air" as used herein is not limited to the atmosphere, and may include any suitable combination comprising oxygen, such as a combination of air and oxygen, or pure oxygen gas. This definition of the term "air" may also be applied to, for example, an air battery or an air electrode.

According to another aspect, a method of preparing a lithium air battery includes forming a cathode interlayer including a second solid electrolyte on an oxygen blocking layer, disposing a lithium metal anode on the oxygen blocking layer; and disposing a composite cathode on the cathode interlayer to prepare the lithium battery.

The oxygen blocking layer may be an ion conducting solid electrolyte layer as described above. For example, the ion conducting solid electrolyte layer may be a LATP substrate.

A method of disposing the interlayer is not particularly limited, but the interlayer may be formed using various methods such as coating, drying, deposition, or sputtering depending on a type of the first solid cathode electrolyte including the interlayer, and any method available in the art may be used.

For example, a cathode interlayer including a solid polymer electrolyte may be formed by coating the LATP substrate with a composition including an ionically conducting polymer and a lithium salt.

The coating may be performed using a casting method, a spray method, a doctor blade method, a print method, a spin-coating method, a spray coating method, a dip coating method, or a knife coating. In one embodiment, the coating may be performed by a spin-coating method.

The drying may be performed in a temperature range of room temperature (about 20° C. to about 25° C.) to about 150° C. The drying may be performed in a vacuum condition. The vacuum condition may include a pressure in a range of about 0.1 Torr to about 1 Torr.

The lithium air battery may be, for example, prepared in the following manner.

First, a cathode paste is prepared. The cathode paste may be prepared by mixing a porous carbonaceous material and a polymer electrolyte while heating the mixture. The polymer electrolyte may be prepared in the form of a film by mixing and drying an ion conducting polymer and a lithium salt with a solvent. The polymer electrolyte film may be used as a cathode interlayer. The cathode interlayer may be coated on an oxygen blocking layer.

The cathode paste is coated on the cathode interlayer coated oxygen blocking layer, prepared as disclosed above, to form a composite cathode.

Next, an anode, e.g., a thin film of lithium metal, is mounted on one side of a case; an anode interlayer, e.g., a polymer electrolyte film, is mounted on the anode; and then an oxygen blocking layer, a cathode interlayer and a composite cathode are sequentially stacked thereon, and disposed on the anode interlayer. A carbon paper and a nickel (Ni) mesh current collector are sequentially stacked on the composite cathode, and the stack is fastened by pressing with a pressing member, through which air may be transferred to an air electrode, thereby completing manufacture of a lithium air battery.

The case may include a lower part in contact with the anode and an upper part in contact with the composite cathode. An insulation resin is disposed between the upper part and the lower part to electrically insulate the air electrode and the anode.

The disclosed embodiment will be described in further detail with reference to the following examples. These examples are for illustrative purposes only and shall not limit the scope of the present disclosure.

EXAMPLES

Preparation Method of Composite Cathode/Cathode Interlayer/Oxygen Blocking Layer Structure Example 1

Preparation of Composite Cathode/Cathode Interlayer/Oxygen Blocking Layer Structure 2.07 g of polyethylene oxide (PEO, Mw=600,000, Aldrich, 182028) was dissolved in 100 milliliters (mL) of acetonitrile to prepare a PEO solution, LiTFSi was added thereto to have a molar ratio of polyethylene oxide (PEO) to lithium of =18:1 and dissolved by stirring the solution, and thus a polymer electrolyte composition for forming a cathode interlayer was obtained.

10 mL of the polymer electrolyte composition was placed on an inorganic lithium ion conductor LICGC™ (LATP, Ohara Inc., at a thickness of 250 µm), spin-coated by rotating with a spin-coater at a rate of 1000 rpm for 60 seconds, dried in a dry room at room temperature (at about 20° C.) for 12 hours, vacuum-dried (at about 50° C. for 2 hrs), and thus a cathode interlayer/oxygen blocking layer structure having a cathode interlayer formed on an oxygen blocking layer (LATP) was prepared.

A coating amount of the cathode interlayer was 0.0785 mg/cm$^2$, and a thickness of the cathode interlayer was about 1 µm.

Next, 1.15 grams (g) of polyethylene oxide (PEO, Mw=600,000, Aldrich, 182028) was dissolved in 50 mL of acetonitrile to prepare a PEO solution, and LiTFSi was added thereto to have a molar ratio of polyethylene oxide (PEO) to lithium of 10:1 and dissolved by stirring the solution. Then, the solution was poured on a Teflon dish, dried in a dry room at room temperature for 2 days, vacuum-dried (at about 60° C., overnight) to remove the solvent, and thus a cathode electrolyte film was obtained.

Carbon black (Printex®, Orion Engineered Chemicals, USA) was vacuum-dried (at about 120° C. for 24 hrs). The carbon black and the cathode electrolyte film were weighed at a predetermined weight ratio, mechanically kneaded while heating (at about 40° C. to about 60° C.), and thus a cathode paste was prepared. A weight ratio of the carbon black and the cathode electrolyte was 1:3.

The cathode paste was spread on the cathode interlayer of the cathode interlayer/oxygen blocking layer structure, and was coated by using a roller to prepare a composite cathode/cathode interlayer/anode solid electrolyte layer structure.

A thickness of the composite cathode was about 30 µm.

Example 2

Preparation of Composite Cathode/Cathode Interlayer/Oxygen Blocking Layer Structure A structure was prepared in the same manner as in Example 1, except that a weight ratio of the carbon black and the cathode electrolyte was changed to 1:4.

A coating amount of the cathode interlayer was about 0.0785 mg/cm$^2$, and a thickness of the cathode interlayer was about 1 μm. A thickness of the composite cathode was about 30 μm.

Example 3

Preparation of Composite Cathode/Cathode Interlayer/Oxygen Blocking Layer Structure A structure was prepared in the same manner as in Example 1, except that a thickness of the cathode interlayer was changed to about 0.4 μm.

Example 4

Preparation of Composite Cathode/Cathode Interlayer/Oxygen Blocking Layer Structure A structure was prepared in the same manner as in Example 1, except that a thickness of the cathode interlayer was changed to about 0.7 μm.

Comparative Example 1

Preparation of Composite Cathode/Oxygen Blocking Layer Structure

A structure was prepared in the same manner as in Example 1, except that the step of disposing the cathode interlayer was omitted.

Comparative Example 2

Preparation of Composite Cathode/Oxygen Blocking Layer Structure

A structure was prepared in the same manner as in Example 2, except that the step of disposing the cathode interlayer was omitted.

Preparation of Lithium Air Battery

Example 5

Manufacture of Lithium Air Battery

Figure 2:
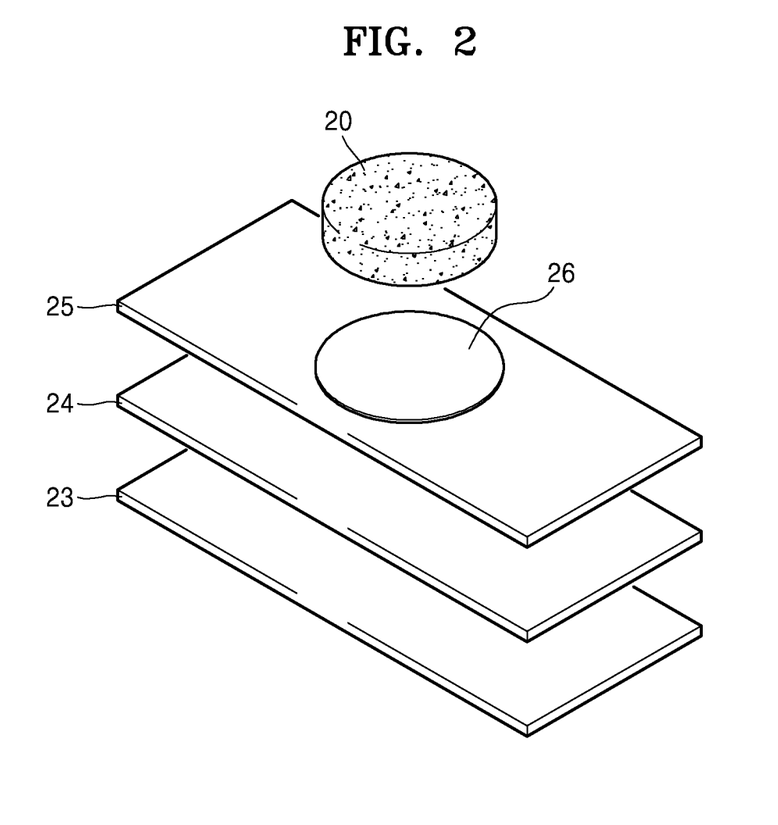
FIG. 2 is a schematic view of a structure of a lithium air battery prepared in Example 5.

Li metal foil was brushed and then attached to a Cu foil to prepare an anode 23, and a 15% SiO$_2$—PEO layer was used as an anode interlayer 24 to prevent direct contact between LATP and Li. Here, the 15% SiO$_2$—PEO layer was prepared in the following manner.

PEO (Mw=600,000), Nano SiO$_2$, and LiTFSi were added to 100 mL of acetonitrile and mixed for 12 hours or more. A molar ratio of LiTFSi and PEO were about 1:18, and a content of SiO$_2$ in the SiO$_2$—PEO layer was about 15 wt %.

A lithium metal and an anode interlayer were stacked sequentially, and the composite cathode 26/cathode interlayer (not shown)/oxygen blocking layer 25 structure prepared in Example 1 was placed thereon to prepare a cell having a structure shown in FIG. 2. As shown in FIG. 2, the LATP electrolyte 25, which is an oxygen blocking layer, was disposed adjacent to the anode interlayer 24.

A carbon paper (35 BA, available from SGL) 20 was placed on the other surface of the composite cathode 26, and a Ni mesh was placed thereon as a current collector, thereby completing manufacture of a lithium air battery.

Examples 6 to 8

Manufacture of Lithium Air Battery

Lithium air batteries were prepared in the same manner as in Example 1, except the structures prepared in Examples 2 to 4 were used instead of the structure prepared in Example 1.

Comparative Examples 3 and 4

Manufacture of Lithium Air Battery

Lithium air batteries were prepared in the same manner as in Example 1, except the structures prepared in Comparative Examples 1 and 2 were used instead of the structure prepared in Example 1.

Evaluation Example 1

Impedance Measurement

Figure 3:
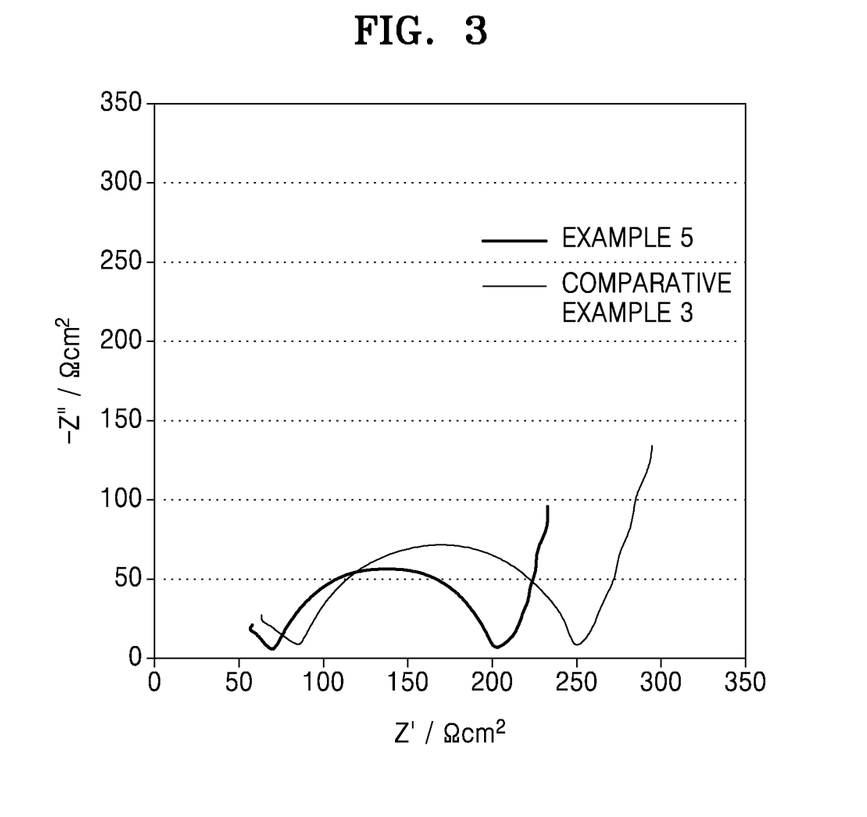
FIG. 3 is graph of imaginary resistance ($Z''$, ohms $cm^2$) versus real resistance ($Z'$, ohms·$cm^2$) and is a Nyquist plot illustrating the results of impedance measurement of lithium air batteries prepared in Example 5 and Comparative Example 3.

A resistance of the membrane-electrode assembly (MEA) was measured by using a 2-probe method with an impedance analyzer (Solartron 1260A Impedance/Gain-Phase Analyzer) with respect to each of the lithium air batteries prepared in Examples 5 to 8 and Comparative Examples 1 and 2. A current density was 0.4 amperes per square centimeter (A/cm$^2$), an amplitude was ±10 mV, and a frequency range was about 0.1 Hertz (Hz) to about 10 kHz. A Nyquist plot of the impedance measurement results of the lithium air batteries prepared in Example 5 and Comparative Example 3 are shown in FIG. 3. In FIG. 3, an interfacial resistance ($R_{inf}$) of a membrane-electrode assembly is determined by the location and size of a semicircle. A difference between the first x-intercept and the second x-intercept of the semicircle denotes an interfacial resistance ($R_{inf}$) of an electrode. The analysis results of the graph shown in FIG. 3 are shown in Table 1.

TABLE 1

| | Interfacial resistance($R_{inf}$) [ohm · cm$^2$] |
|---|---|
| Example 5 | 121.5 |
| Comparative Example 3 | 160.7 |

As shown in Table 1, the lithium air battery prepared in Example 5 had a decreased interfacial resistance compared to that of the lithium air battery prepared in Comparative Example 3.

While not wanting to be bound by theory, it is understood that the decrease in the interfacial resistance may be caused by reduction of an interfacial resistance between the composite cathode and the oxygen blocking layer (LATP) due to introduction of the cathode interlayer.

Evaluation Example 2

Charging/Discharging Characteristics Evaluation

Figure 4:
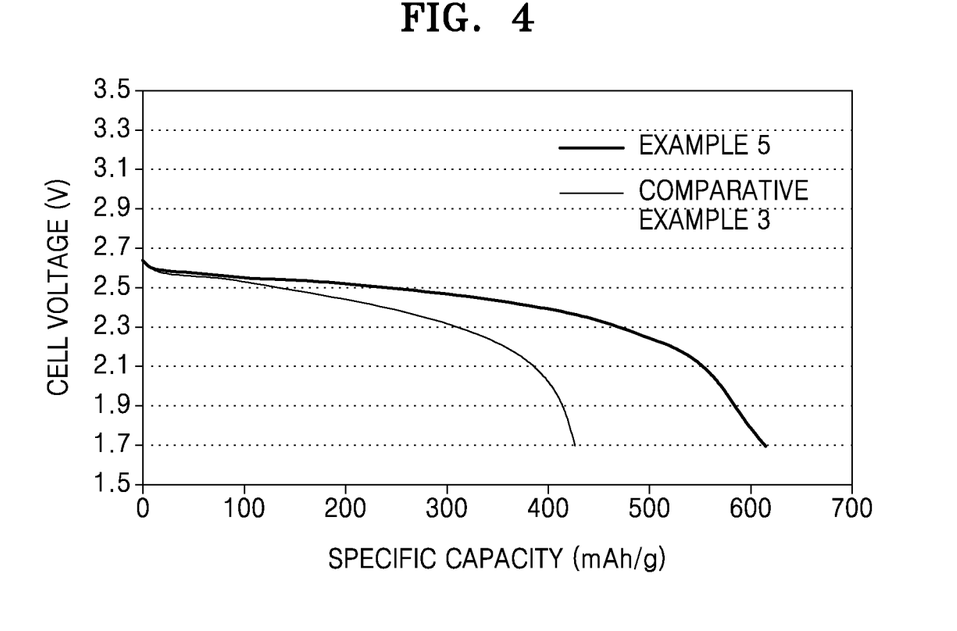
FIG. 4 is a graph of cell voltage (Volts, V) versus specific capacity (milliampere-hours per gram, mAh/g) and shows a $1^{st}$ discharge cycle of the lithium air batteries prepared in Example 5 and Comparative Example 3.
Figure 5:
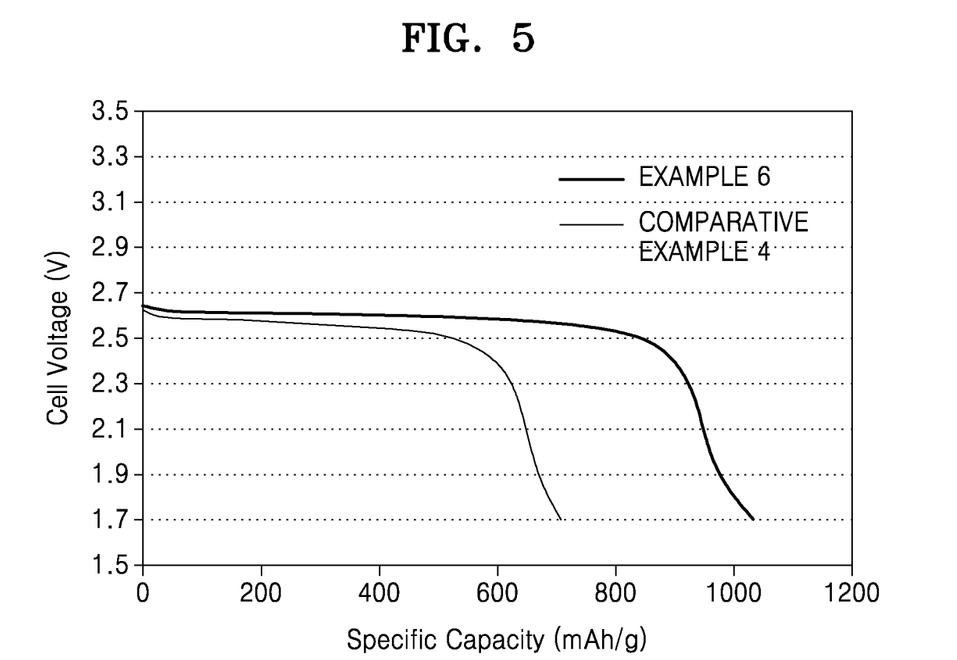
FIG. 5 is a graph of cell voltage (Volts, V) versus specific capacity (milliampere-hours per gram, mAh/g) and shows a $1^{st}$ discharge cycle of the lithium air batteries prepared in Example 6 and Comparative Example 4.

A charging/discharging cycle including discharging a battery with a constant current of 0.24 mA/cm$^2$ until a voltage of the battery was 1.7 V (vs. Li), charging the battery with the same constant current until a voltage of the battery was 4.2 V, and then charging the battery with a constant voltage until a charging current was 0.02 mA/cm² was performed on the lithium air batteries prepared in Examples 5 to 8 and Comparative Examples 3 and 4 at a temperature of 60° C. and a pressure of 1 atmosphere in an oxygen atmosphere. Some of the results after the first cycle of charging/discharging are shown in Table 2 and FIGS. 4 and 5.

A unit weight of a discharge capacity is a weight of a cathode including a carbonaceous material, a lithium salt, and a solid electrolyte.

TABLE 2

|  | Discharge capacity [mAh/g] |
|---|---|
| Example 5 | 607.6 |
| Example 6 | 1033.0 |
| Example 7 | 817.8 |
| Example 8 | 863.9 |
| Comparative Example 3 | 405.9 |
| Comparative Example 4 | 708.6 |

As shown in Table 2, although the cathode interlayer was added, the lithium air batteries prepared in Examples 5 to 8 had increased discharge capacities and decreased overvoltage compared to those of the lithium air batteries prepared in Comparative Examples 3 and 4.

While not wanting to be bound by theory, it is understood that the increase in the discharge capacity is caused by a reduced internal resistance of the lithium air battery because the cathode interlayer reduced an interface irregularity and an interfacial resistance between the cathode and the first anode solid electrolyte layer.

As described above, according to the one or more of the above exemplary embodiments, when a lithium air battery further includes an interlayer between a cathode and a lithium ion conducting medium, an interfacial resistance between the cathode and the lithium ion conducting medium decreases, and thus charging/discharging characteristics of the lithium air battery improves.

It should be understood that the exemplary embodiments described herein should be considered in a descriptive sense only and not for purposes of limitation. Descriptions of features, advantages, or aspects within each exemplary embodiment should typically be considered as available for other similar features, advantages, or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A lithium air battery comprising:
   a cathode current collector;
   a composite cathode disposed on the cathode current collector, the composite cathode comprising a porous material and a first solid electrolyte, the first solid electrolyte comprising a first polymer electrolyte and a first lithium salt, wherein the porous material is intermixed with the first solid electrolyte, and wherein the composite cathode does not comprise a gel electrolyte or a liquid electrolyte;
   a lithium metal anode;
   an oxygen blocking layer adjacent to the anode; and
   a cathode interlayer disposed between the composite cathode and the oxygen blocking layer,
   wherein the cathode interlayer comprises a lithium ion conductive second solid electrolyte.

2. The lithium air battery of claim 1, wherein the cathode interlayer does not comprise a gel.

3. The lithium air battery of claim 1, wherein the cathode interlayer is non-porous.

4. The lithium air battery of claim 1, wherein a thickness of the cathode interlayer is less than a thickness of each of the composite cathode and the oxygen blocking layer.

5. The lithium air battery of claim 1, wherein a thickness of the cathode interlayer is 50 μm or less.

6. The lithium air battery of claim 1, wherein the lithium ion conductive second solid electrolyte comprises a second polymer electrolyte.

7. The lithium air battery of claim 6, wherein the first polymer electrolyte or the second polymer electrolyte comprises a polymer having a weight average molecular weight of about 1,000 to about 600,000 Daltons.

8. The lithium air battery of claim 1, wherein the first polymer electrolyte comprises an ionically conducting polymer.

9. The lithium air battery of claim 8, wherein the ionically conducting polymer comprises at least one selected from polyethylene oxide, polyvinylalcohol, and polyvinylpyrrolidone, or Li-substituted tetrafluoroethylene-perfluoro-3,6-dioxa-4-methyl-7-octenesulfonic acid copolymer.

10. The lithium air battery of claim 1, wherein the second solid electrolyte and the first solid electrolyte comprise a same solid electrolyte.

11. The lithium air battery of claim 1, wherein the cathode interlayer consists of an ionically conducting polymer and a second lithium salt.

12. The lithium air battery of claim 11, wherein the second lithium salt comprises at least one selected from $LiPF_6$, $LiBF_4$, $LiAsF_6$, $LiClO_4$, $LiNO_3$, lithium bis(oxalato) borate, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

13. The lithium air battery of claim 1, wherein the porous material comprises a carbonaceous material.

14. The lithium air battery of claim 1, wherein the weight ratio of the porous material to the first solid electrolyte is in a range of about 1:2 to about 1:9.

15. The lithium air battery of claim 1, wherein the oxygen blocking layer is impervious to oxygen.

16. The lithium air battery of claim 1, further comprising an anode interlayer between the anode and the oxygen blocking layer, wherein the anode interlayer comprises a third solid electrolyte.

17. The lithium air battery of claim 1, wherein the first lithium salt is $LiPF_6$, $LiBF_4$, $LiAsF_6$, $LiClO_4$, $LiNO_3$, lithium bis(oxalato) borate, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or a combination thereof.

18. The lithium air battery of claim 1, wherein the composite cathode is derived by mechanically mixing the porous material and the first solid electrolyte.

* * * * *